United States Patent [19]

Miyazaki et al.

[11] Patent Number: 4,680,650
[45] Date of Patent: Jul. 14, 1987

[54] MAGNETIC VIDEO SIGNAL RECORDING AND REPRODUCING SYSTEM

[75] Inventors: Takao Miyazaki; Hideo Yamamoto, both of Tokyo, Japan

[73] Assignee: Clarion Co., Ltd., Tokyo, Japan

[21] Appl. No.: 732,203

[22] Filed: May 8, 1985

[30] Foreign Application Priority Data

May 16, 1984 [JP] Japan .................................. 59-99300

[51] Int. Cl.⁴ ...................... G11B 21/10; G11B 5/588; G11B 15/18
[52] U.S. Cl. .................................. 360/33.1; 360/74.1; 360/14.1; 360/77
[58] Field of Search .................... 360/74.4, 74.1, 14.1, 360/14.2, 77, 70, 33.1

[56] References Cited

U.S. PATENT DOCUMENTS

| 4,463,391 | 7/1984 | Takano | 360/74.4 |
| 4,520,406 | 5/1985 | Suzuki | 360/14.2 |
| 4,554,602 | 11/1985 | Tobe | 360/14.2 |

*Primary Examiner*—Alan Faber
*Attorney, Agent, or Firm*—Flynn, Thiel, Boutell, & Tanis

[57] ABSTRACT

When video signal recording on a single magnetic tape is to be interrupted and subsequently resumed, a pause button is operated and then released so as to roll back the tape, subsequently produce the playback mode for a time, and resume the recording mode when the tape is transported forward by the rolled-back length. The system uses three timers individually activated during the interruption of recording to control different circuits related to tape transportation so that resumption of recording is effected after an auto tracking (proper track tracing by the magnetic heads) is established.

6 Claims, 7 Drawing Figures

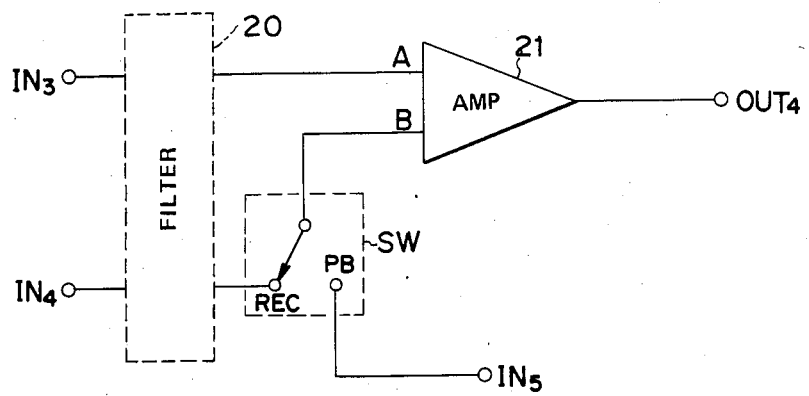

MAGNETIC VIDEO SIGNAL RECORDING AND REPRODUCING SYSTEM

FIELD OF THE INVENTION

This invention relates to a magnetic video signal recording and reproducing system in a video tape recorder not using control signals, which system allows an interruption of video signal recording on a single video tape without producing any discontinuity in reproduced pictures.

BACKGROUND OF THE INVENTION

To interrupt and resume recording on a single video tape in a video tape recorder, a pause button is operated to temporarily stop the movement of the tape.

Most video tape recorders are adapted to record control signals on a tape together with video signals.

When the pause button is operated to interrupt the recording, capstans are rotated in the reverse direction to roll back the tape by a length corresponding to a predetermined number of control signals and the tape is then stopped there until the capstans are rotated in the forward direction due to release of the pause button. When the capstan transports the tape in the forward direction by the back-rolled length corresponding to the given number of control signals, the recorder resumes the recording mode.

The recorder takes the playback mode for a limited time corresponding to the given number of control signals after the pause button is released and before the recording mode is resumed, so that a head properly traces the recorded tracks on the tape (in order that a proper tracking of the head is established) within the limited time so that subsequently recorded control signals are in phase with the previously recorded control signals. Thus no turbulence nor discontinuity is produced in reproduced pictures regardless of the interruption in the signal recording.

Some video tape recorders, however, do not use control signals. In this case, some other method is required so that an interruption in signal recording on a single video tape never produces any turbulence or discontinuity in reproduced pictures.

OBJECT OF THE INVENTION

It is therefore an object of the invention to provide a magnetic video signal recording and reproducing system for a video tape recorder not using control signals, which system enables interruption and resumption of recording on a single video tape without producing any turbulence or discontinuity in reproduced pictures due to the interruption.

SUMMARY OF THE INVENTION

In accordance with the present invention, there is provided a magnetic recording system in a video tape recorder comprising:

a video recording process circuit which transmits entered video signals to video heads so that the video heads record the video signals on a magnetic tape;

a video reproduction process circuit which receives video signals detected from the magnetic tape by said video heads;

a servo circuit which controls a cylinder driving motor for driving a rotary cylinder provided with said video heads and controls a capstan motor for driving a capstan.

an automatic tracking circuit which supplies said servo circuit with an auto tracking signal to control said capstan motor;

a system control circuit which controls said all circuits to activate them in a selected one of recording and playback modes; and first, second and third timers provided in said system control circuit;

operation of a pause button of the video tape recorder causing video amplifiers in both process circuits and in said servo circuit to be changed to the playback mode and activating said first timer to rotate said capstan in the reverse direction for a first given duration to roll back the video tape by a predetermined length and to then hold it there after expiration of said first given duration, release of said pause button causing said capstan to resume its forward rotation to transport the tape in the forward direction and activating said second timer for a second given duration to change said servo circuit into the recording mode on expiration of said second duration in order to permit the system to establish an auto tracking within said second given duration, said third timer being activated on expiration of said second given duration for a third given duration to change said video amplifiers into the recording mode on expiration of said third given duration.

The invention will be better understood from the discription given below, referring to a preferred embodiment illustrated in the drawings.

BRIEF DESCRIPTION OF THE DRAWINGS

FIG. 4 is a timing chart of several different circuit components of FIG. 3;

FIG. 7 is a block diagram showing a change of the system from the playback mode to the recording mode.

DETAILED DESCRIPTION

Figure 1:
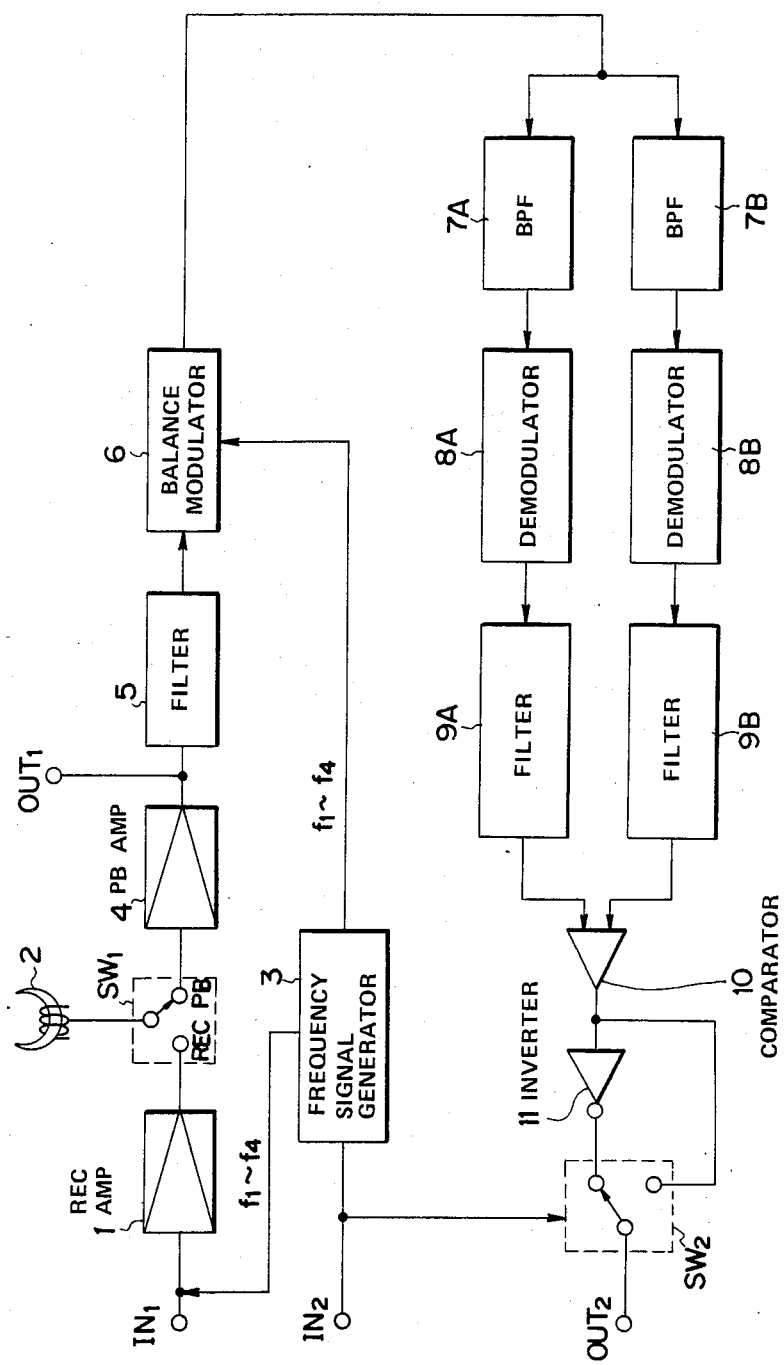
FIG. 1 is a block diagram of a tracking system in a video tape recorder not using control signals.

Before explaining the invention itself, a tracking system not using control signals is explained, referring to FIG. 1.

An input terminal $IN_1$ receives video signals including Y (luminance) signals and colour signals. Another input terminal $IN_2$ receives head switching signals to selectively or alternately supply two magnetic heads with the video signals each half revolution (each field) in response to the head switching signals.

A different frequency generating circuit 3 produces in sequence four signals $f_1$, $f_2$, $f_3$ and $f_4$ (hereinafter called "pilot signals") in different frequencies, synchronized with each head swithcing signal (each field). The pilot signals $f_1$–$f_4$ are recorded on a video tape together with the video signals to enable the recorder to establish a proper tracking during the playback mode. More specifically, two pilot signals in two adjacent video tracks produce a cross torque signal whose magnitude depends on how far the head is mislocated from a track to be traced. An output terminal $OUT_2$ supplies a tracking error signal based on the cross torque signal to a capstan motor to control the velocity thereof.

For example, assume now that $f_1=6.5f_H$, $f_2=7.5f_H$, $f_3=10.5f_H$ and $f_4=9.5f_H$ (where $f_H$ is a horizontal synchronization signal).

During the recording mode of the system, video signals entered in the terminal $IN_1$ are mixed with pilot signals $f_1-f_4$ from the different frequency generating circuit 3 and are applied to the recording amplifier 1. Video head 2 records the mixed signals on a video tape while a switch $SW_1$ takes a position REC for the recording mode. Thus the two video heads alternately record, field by field, video tracks $A_1$, $B_1$, $A_2$ and $B_2$ on a tape 12 as shown in FIG. 2, and each field includes the pilot signals $f_1-f_4$ in sequence.

Figure 2:
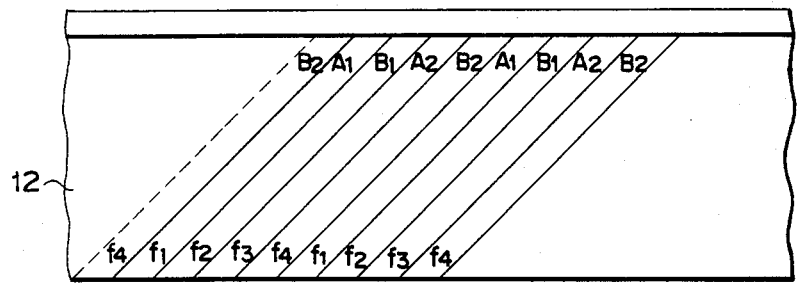
FIG. 2 shows a video tape with some recorded video tracks.

During the reproduction mode of the system, the switch $SW_1$ takes a position PB for the play back mode, and the video heads 2 detect the video signals on the tape 12 of FIG. 2 and apply them to a reproduction amplifier 4. The Y signals and colour signals in the video signals are extracted from the terminal $OUT_1$ and applied to a signal processing system. The pilot signals $f_1-f_4$, however, are extracted by a filter 5 and applied to the balance modulator 6. The balance modulator 6 adds the filtered pilot signals $f_1-f_4$ to pilot signals $f_1-f_4$ which are supplied from the different-frequency generator 3, synchronizing the head switching signals. Thus the pilot signals from the filter 5 are balance modulated by the pilot signals from the circuit 3. That is, both pilot signals are balance-modulated therebetween. The result of the balance modulation is entered in a band pass filter 7A or 7B.

In scanning of the video tracks on the tape 12 by the video head 2, if the tracking of the tracks $A_1$ and $A_2$ by one of the heads is shifted to the right in FIG. 2, a component expressed by (a) $|f_1-f_2|=|f_3-f_4|=f_H$ is detected due to the fault tracking. If the tracking is shifted to the left, a component expressed by (b) $|f_1-f_4|=|f_3-f_2|=3f_H$ is detected.

Similarly, in scanning the tracks $B_1$ and $B_2$ by the other head, (c) $|f_2-f_3|=|f_4-f_1|=3f_H$ represents a rightward displacement, and (d) $|f_2-f_1|=|f_4-f_3|=f_H$ shows a leftward displacement. These $f_H$ components (a) and (d) and $3f_H$ components (b) and (c) detected with respect to one of the tracks to be traced are cross torque components due to right and left adjacent tracks, and they change in response to the significance of the tracking error.

Therefore, the band pass filter 7A or 7B receives one of the cross torque components (a)–(d) during each field scanning of the tracks $A_1$ and $A_2$ or $B_1$ and $B_2$ of FIG. 2. Thus one of the band pass filters (7A, for example) is designed to transmit the $f_H$ component (a) and (d) whereas the other filter (7B, for example) transmits the $3f_H$ component (b) and (c).

The cross torque components $f_H$ and $3f_H$ are applied to a comparator 10 via detectors 8A and 8B and filters 9A and 9B. The comparator 10 compares them and discrimates in which direction each one-field tracking is displaced, to the right or to the left. As the result, a tracking error signal based on the cross torque signals (a)–(d) is produced.

Since the cross torque signal based on the tracking displacement of the tracks $A_1$ and $A_2$ has an opposite polarity to that of the cross torque signal based on the tracking displacement of the tracks $B_1$ and $B_2$ in the same direction, an inverter 11 changes the polarity of one of the cross torque signals to normalize their polarities. When a switch $SW_2$ connects a terminal $OUT_2$ to the inverter 11, the cross torque component signals having uniform polarity are applied to the terminal $OUT_2$.

Therefore, at every instant of one field scanning, the output terminal $OUT_2$ produces a cross torque component signal related to the tracking displacement, and the signal is used as a tracking error signal.

The tracking error signal is used to control a capstan motor, thus establishing an automatic tracking without using control signals.

The invention uses the above-described automatic tracking system to provide a magnetic video signal recording and reproducing system which enables interrupted but successive recording on a single video tape.

The invention will be described hereunder, referring to a preferred embodiment illustrated in a block diagram in FIG. 3. Reference numeral 13 denotes a video recording process circuit, 14 designates a video reproduction process circuit, 15 refers to a cylinder motor for driving a rotatable cylinder 15' with two video heads 2, 16 refers to a capstan motor for driving a capstan 16', 17 refers to a servo circuit, 18 refers to an automatic tracking circuit using the system of FIG. 1 comprising members 3, 5–11, $SW_2$, etc. of FIG. 1, 19 refers to a system control circuit, $SW_3$ refers to a switch, and $OUT_3$ refers to a video signal output terminal. The servo circuit 17 supplies the auto tracking circuit 18 with head switching signals $S_H$, and the circuit 18 supplies the recording amplifier 1 with pilot signals $f_1-f_4$. One of the pilot signals extracted from an output of the reproducing amplifier 4 is applied to the auto tracking circuit 18.

A first timer 21, second timer 22 and a third timer 23 are provided in the system control circuit 19, for example, and are activated for respective given durations within the period after a pause button is operated to interrupt the recording mode and before the recording mode is resumed.

Assume now that the recorder is in the recording mode. Thus all circuit components governing the recording or playback mode of the recorder are disposed in the recording mode, and video signals entered through the terminal $IN_1$ and transmitted to the video heads 2 via the recording process circuit 13 and the recording amplifier 1 are recorded on a tape by the heads 2.

Referring now to FIG. 4, which shows changes in the mode or rotating direction of the video process circuits at (a), video amplifiers at (b), servo circuit at (c) and capstan at (d), they are now in the recording mode, and the capstan is rotating in the forward direction.

In the recording mode, if the pause button is operated at a time $t_1$ as shown is FIG. 4, the recording and playback video process circuits at (a), video amplifiers at (b) and the servo circuit at (c) are switched to the playback mode, and the capstan is rotated in the reverse direction to roll back the tape. The first timer 21 is activated by the operation of the pause button to maintain the reverse rotation of the capstan for a limited duration $T_1$. At a time $t_2$ (after expiration of the duration $T_1$), the capstan stops the reverse rotation, and the tape is placed in a stand-by mode at the rolled-back position.

When the pause button is released at a desired time $t_3$ after expiration of the duration $T_1$, the capstan resumes its forward rotation and transports the tape forward. The second timer 22 is activated by the release of the pause button for a limited duration $T_2$ to cause the video process circuits at (a) and the servo circuit at (c) to be switched into the recording mode at a time $t_4$ when the duration $T_2$ expires. The video amplifiers at (b), however, are still maintained in the playback mode.

During the duration $T_2$, since the video process circuits at (a) and the servo circuit at (c) are in the playback mode, the automatic tracking circuit 18 obtains a tracking error signal to establish the automatic tracking as shown in FIG. 1. That is, the duration $T_2$ is reserved for the automatic tracking during the limited playback mode. On expiration of the duration $T_2$, a perfect auto tracking is established.

At the time $t_4$, the recorder does not resume the recording mode regardless of expiration of the duration $T_2$, because the video amplifiers at (b) still maintain the playback mode.

The third timer 23 is activated at the time $t_4$ (on expiration of the duration $T_2$) to switch the video amplifiers at (b) into the recording mode at a time $t_5$ when a limited duration $T_3$ expires. The duration $T_3$ is reserved to defer the change to the recording mode for a given time and resume it only after the cylinder and capstan are reliably activated by the servo circuit 17. Thus the recording mode is resumed at the time $t_5$. Since the auto tracking is already established at the time $t_5$, and the heads properly trace the previously recorded tracks, resumed and successive recording will be in phase with the previous recording. That is, the pilot signals of the tracking coincide in sequence with the previously recorded pilot signals.

In the above described operation of the system, the capstan is changed from the auto tracking rotation to the crystal-locked rotation in the recording mode. This change from the track ON state in the auto tracking mode to the crystal-locked state is effected in a smooth fashion because the phase errors in both states are substantially equal.

The change of the cylinder from the playback mode to the recording mode is also effected in a smooth fashion, because vertical synchronization signals $f_v$ supplied in the recording mode may be masked to give the same effect as the crystal lock before the recording mode is stabilized.

FIG. 7 shows how the recorder is changed from the playback mode to the recording mode. Reference numeral $IN_3$ designates a speed error signal terminal, $IN_4$ denotes a recording phase error signal terminal, $IN_5$ refers to an auto tracking error signal terminal, $OUT_4$ refers to a motor control voltage terminal, SW refers to a recording/playback changeover switch, 20 refers to a filter, and 21 refers to an amplifier. The error level of the terminal $IN_5$ in the ON track state during the playback mode substantially equals the error level of the terminal $IN_4$ in the recording mode when they appear at an input B of the amplifier 21. Therefore, no substantial change is produced in the motor control voltage at the terminal $OUT_4$, and the recording mode is established in a smooth fashion.

The durations $T_1$, $T_2$ and $T_3$ provided for the first, second and third timers 21, 22 and 23 must have a relationship $T_1 > T_2 + T_3$.

Figure 5:
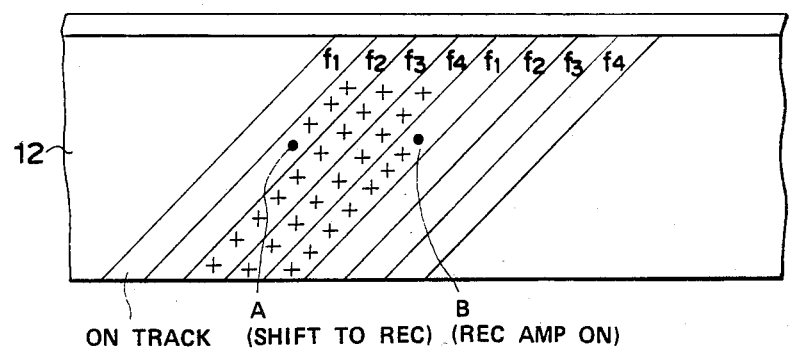
FIGS. 5 and 6 each shows a video tape with some video tracks.

FIG. 5 shows how the above-described operations represent their relationship on the video tracks. A point A is a position of the head at the time $t_4$, a point B is a position at the time $t_5$, and the head moves from the point A to the point B in the duration $T_3$ when the recording amplifier is not yet activated.

Figure 3:
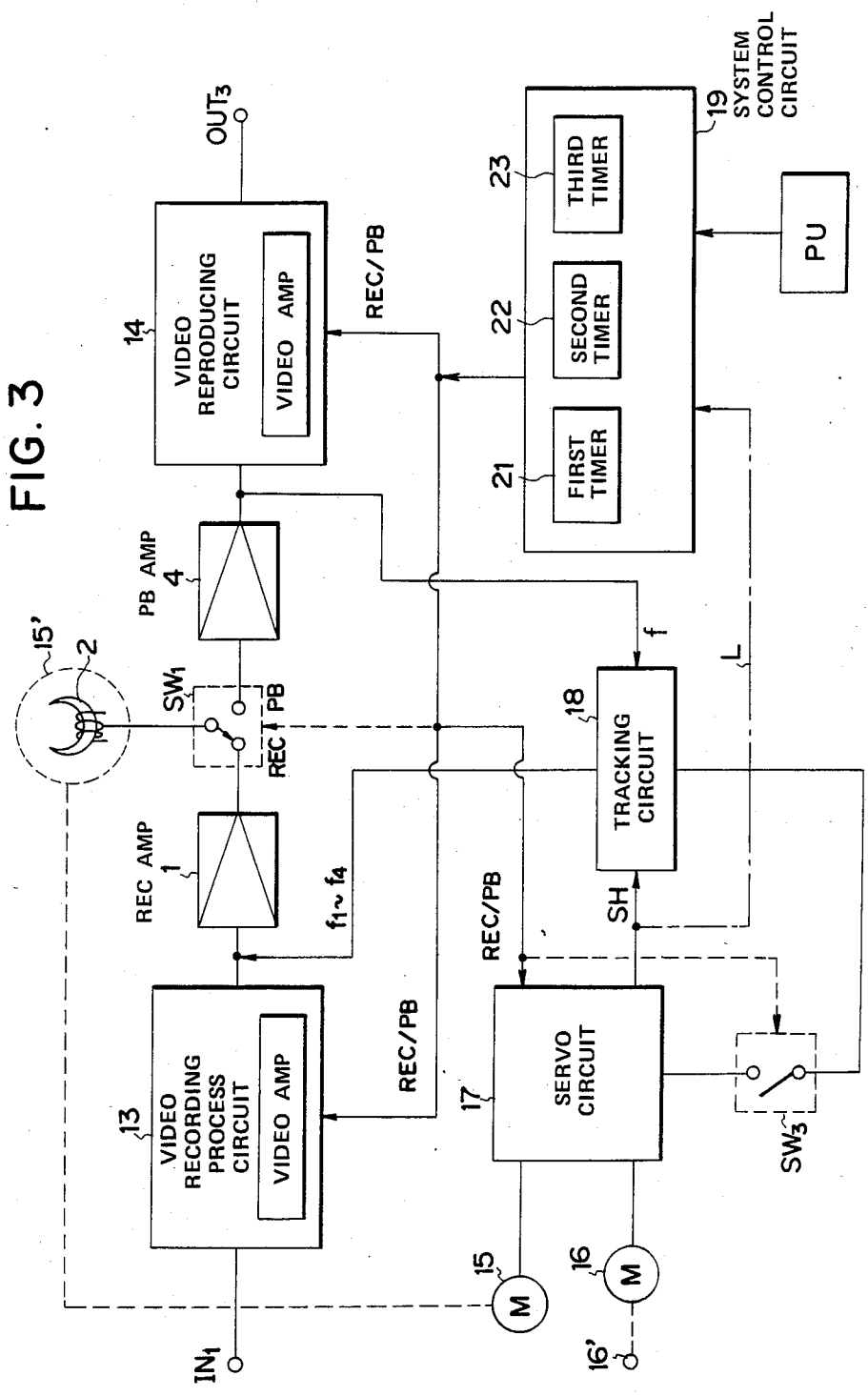
FIG. 3 is a block diagram of a magnetic recording or reproducing system embodying the invention.

As shown by a chain line L in FIG. 3, the head swithching signal $S_H$ supplied from the servo circuit 17 to the auto tracking circuit 18 may be used to synchronously switch the video amplifiers at (b) of FIG. 4 into the recording mode after expiration of the duration $T_3$ of the third timer 23.

Figure 6:
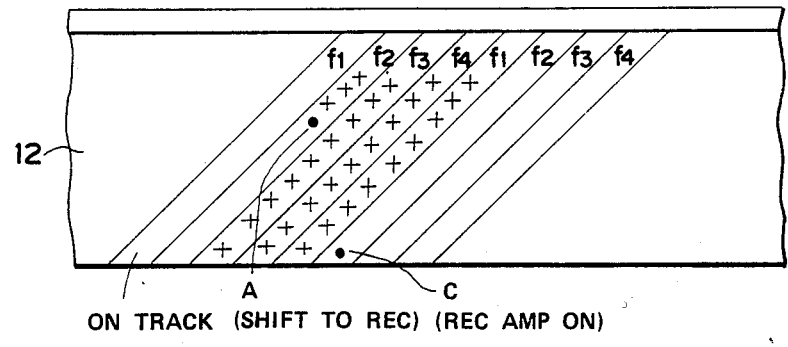

Thus the tracking pilot signals coincide in order with the previously recorded pilot signals, and they are never entered in a central or intermediate position of a track. Therefore, the switching of the video amplifiers into the recording mode is always effected at an end position C of FIG. 6, and the video signals recorded before and after an interruption of recording are connected at a position which does not appear markedly in reproduced pictures.

As described above, the invention uses the first, second and third timers. The first timer is activated by operation of the pause button during the recording mode to rotate the capstan in the reverse direction for a first limited duration. The second timer is activated by release of the pause button at a desired time after expiration of the first limited duration to maintain the playback mode for a second limited duration and permit the recorder to establish the auto tracking in the second duration. The third timer is activated by expiration of the second limited duration to maintain the playback mode for a third limited duration to stabilize the operation of the servo circuit so that the recording mode is resumed on expiration of the third duration when the servo circuit is operating reliably. Therefore, the invention system enables interrupted but successive video signal recording in a video tape recorder not using control signals.

The invention system gives a great advantage if used in an 8 mm VTR which in general does not use control signals.

The embodiments of the invention in which an exclusive property or privilege is claimed are defined as follows:

1. A magnetic recording system in a video tape recorder capable of operating in recording and reproduction modes, comprising:
   a video recording process circuit which has a first video amplifier and which transmits input video signals to video heads so that said video heads record the video signals on a magnetic tape when the video tape recorder is in the recording mode;
   a video reproduction process circuit which has a second video amplifier and which receives video signals reproduced from the magnetic tape by said video heads when the video tape recorder is in the reproduction mode;
   a servo circuit which controls a cylinder driving motor for driving a rotary cylinder having thereon said video heads and which controls a capstan motor adapted to drive a capstan, movement of said capstan effecting movement of the magnetic tape;
   an automatic tracking circuit which supplies said servo circuit with an auto tracking signal, said servo circuit controlling said capstan motor in response to said auto tracking signal; and
   a system control circuit which controls said video recording process circuit, said video reproduction process circuit, said servo circuit and said automatic tracking circuit;
   wherein said system control circuit includes first, second and third timers which respectively time first, second and third time intervals, and means responsive to actuation of a pause button of the video tape recorder when the video tape player is in the recording mode for causing said first and second video amplifiers and said servo circuit to be changed from a recording mode to a reproduction mode, for activating said first timer and causing said capstan motor to rotate said capstan in a reverse direction for said first time interval of said first timer in order to move the video tape back by a predetermined distance and for stopping said capstan motor after expiration of said first time interval, and means responsive to deactuation of said pause button for causing said capstan motor to resume rotation in a forward direction so as to transport the tape in a forward direction, for activating said second timer and for causing said servo circuit to change back into its recording mode on expiration of said second time interval, said automatic tracking circuit establishing auto tracking during said second time interval, and means for activating said third timer upon expiration of said second timer and for causing said video amplifiers to change back into their recording mode upon expiration of said third time interval; and wherein said auto tracking circuit includes: a four-frequency signal generator which produces four pilot signals of different frequency, said video recording process circuit superposing said pilot signals on said video signals; means for extracting said pilot signals from signals reproduced from the magnetic tape by said video heads; balance-modulating means for balance-modulating the extracted pilot signals and the pilot signals from said four-frequency signal generator; and means responsive to an output signal of said balance-modulating means representative of a tracking error for producing said auto tracking signal.

2. A magnetic recording system of claim 1, wherein said video amplifiers are changed into their recording mode in synchronism with a video head switching signal produced by said servo circuit.

3. A magnetic recording system of claim 2, wherein the sum of said second and third time intervals is less than said first time interval.

4. A magnetic recording system of claim 1, wherein the sum of said second and third time intervals is less than said first time interval.

5. A magnetic recording system in a video tape recorder which has a manually actuable pause button and which is operable in recording and reproduction modes, comprising:

a video head;
capstan means for effecting lengthwise movement of a magnetic tape past said video head in a selected one of a forward direction and a reverse direction opposite said forward direction;
pilot signal generating means for generating a predetermined pilot signal;
selectively actuable recording circuit means for causing said video head to record on a magnetic tape a composite signal, said composite signal including a video signal having superposed thereon said pilot signal from said pilot signal generating means;
tracking circuit means responsive to said pilot signal from said pilot signal generating means and to a pilot signal reproduced from a magnetic tape by said video head for producing a tracking signal;
servo means operable in a selected one of a crystal-locked mode and a tracking mode and cooperable with said capstan means for causing a magnetic tape to move at a predetermined speed when in said crystal-locked mode and at a speed varying in dependence on said tracking signal when in said tracking mode;
control means for controlling said capstan means, said recording circuit means and said servo means, said control means including means responsive to the video tape recorder being in the recording mode and the pause button being in a deactuated condition for causing said capstan means to effect forward movement of a magnetic tape, for actuating said recording circuit means, and for causing said servo means to be in said crystal-locked mode, said control means further including means responsive to manual actuation of said pause button while the video tape recorder is in the recording mode for deactuating said recording circuit means and for causing said capstan means to effect movement of the magnetic tape in a reverse direction during a first predetermined time interval following actuation of said pause button and to stop movement of the magnetic tape at the end of said first predetermined time interval, said control means further including means responsive to deactuation of said pause button for causing said capstan means to effect forward movement of the magnetic tape, for causing said servo means to be in said tracking mode for a second predetermined time interval following deactuation of said pause button and to be in said crystal-locked mode after said second predetermined time interval has elapsed, and for actuating said recording circuit means at the end of a third predetermined time interval following the end of said second predetermined time interval.

6. A magnetic recording system of claim 5, wherein said pilot signal includes four pilot signal components having different frequencies.

* * * * *